(12) United States Patent
Frankston et al.

(10) Patent No.: US 10,986,090 B1
(45) Date of Patent: Apr. 20, 2021

(54) SECURITY ORCHESTRATION AND AUTOMATION USING BIOMETRIC DATA

(71) Applicant: Rapid7, Inc., Boston, MA (US)

(72) Inventors: Jared Frankston, Newton, MA (US); Barry Curran, Belfast (GB); Luke Milby, Bloomington, IL (US); Ashwin Anand, Acton, MA (US)

(73) Assignee: Rapid7, Inc., Boston, MA (US)

( * ) Notice: Subject to any disclaimer, the term of this patent is extended or adjusted under 35 U.S.C. 154(b) by 130 days.

(21) Appl. No.: 16/416,426

(22) Filed: May 20, 2019

(51) Int. Cl.
*H04L 29/06* (2006.01)
*H04L 12/24* (2006.01)

(52) U.S. Cl.
CPC .......... *H04L 63/0861* (2013.01); *H04L 41/28* (2013.01); *H04L 63/0853* (2013.01); *H04L 63/107* (2013.01)

(58) Field of Classification Search
CPC ............. H04L 63/0861; H04L 63/0853; H04L 63/107; H04L 41/28
See application file for complete search history.

(56) References Cited

U.S. PATENT DOCUMENTS

| | | | | |
|---|---|---|---|---|
| 9,058,468 B2* | 6/2015 | Koukine | ............. | G06F 21/6218 |
| 9,426,150 B2* | 8/2016 | Stern | .................... | H04L 63/0853 |
| 10,673,888 B1* | 6/2020 | Dudhe | ................ | H04L 63/0861 |
| 2006/0034287 A1* | 2/2006 | Novack | ............... | H04L 63/0861 |
| | | | | 370/395.2 |
| 2006/0238607 A1* | 10/2006 | Benco | ................. | H04L 63/0861 |
| | | | | 348/14.01 |
| 2009/0187405 A1* | 7/2009 | Bhogal | .................... | G10L 17/00 |
| | | | | 704/246 |
| 2009/0235326 A1* | 9/2009 | Cho | ..................... | H04L 63/0846 |
| | | | | 726/2 |
| 2010/0216429 A1* | 8/2010 | Mahajan | ............ | G08B 13/1418 |
| | | | | 455/411 |
| 2013/0278414 A1* | 10/2013 | Sprigg | ............... | G08B 21/0453 |
| | | | | 340/539.12 |
| 2014/0059673 A1* | 2/2014 | Azar | ...................... | G06F 21/32 |
| | | | | 726/19 |

(Continued)

*Primary Examiner* — Catherine Thiaw
(74) *Attorney, Agent, or Firm* — Ashwin Anand

(57) ABSTRACT

Disclosed herein are methods, systems, and processes for facilitating security orchestration, automation, and response (SOAR) in cybersecurity computing environments that use biometric data or implement biometric data gathering. An instruction is periodically transmitted to a protected computing device to perform a security scanning operation that captures biometric data generated from a biometric device associated with the protected computing device. The biometric data received from the protected computing device includes a biometric identity of a trusted user or an untrusted user. A security database is accessed to determine whether the biometric identity matches a stored biometric identity of the trusted user. A security workflow that includes orchestrated security operations configured to identify the untrusted user and to prevent the untrusted user from accessing the protected computing device if the biometric identity does not match the stored biometric identity is generated and transmitted to the protected computing device. A confirmation is received from the protected computing device that the orchestrated security operations have been performed.

14 Claims, 9 Drawing Sheets

(56) References Cited

U.S. PATENT DOCUMENTS

| | | | |
|---|---|---|---|
| 2015/0103136 A1* | 4/2015 | Anderson | H04N 7/155 348/14.09 |
| 2016/0092914 A1* | 3/2016 | Wiener | G06Q 30/0246 705/14.45 |
| 2016/0226867 A1* | 8/2016 | Harding | H04L 63/0861 |
| 2016/0248769 A1* | 8/2016 | Han | H04L 63/0861 |
| 2018/0225437 A1* | 8/2018 | Suh | H04W 12/0605 |

* cited by examiner

SECURITY ORCHESTRATION AND AUTOMATION USING BIOMETRIC DATA

BACKGROUND

Field of the Disclosure

This disclosure is related to cybersecurity computing systems. In particular, this disclosure is related to security orchestration and automation using biometric data.

Description of the Related Art

Biometric identifiers are distinctive and measurable characteristics used to label and describe individuals. Examples of biometric identifiers include, but are not limited to, fingerprints, facial recognition, DNA, iris recognition, retina, and the like. Given their ability to uniquely identify individuals, biometric identifiers are often used to control access to protected computing systems, sensitive storage devices, private networks, and the like. Therefore, biometric identifiers are particularly useful in cybersecurity computing environments.

Biometric sensors such as fingerprint scanners, retina scanners, web cameras, and the like, are typically employed to generate actionable biometric data. To improve the reliability and usability of such biometric data, inputs from multiple heterogeneous or homogeneous biometric sensors can be retrieved and combined. Such multimodal biometric systems utilize sensor fusion to combine sensory data from disparate sources such that the resulting biometric data has less uncertainty than would be possible if these sources were queried individually.

Because multimodal biometric systems can obtain biometric data from the same source (e.g., multiple images of an iris, scans of the same finger, and the like) or from disparate sources (e.g., a fingerprint scan followed by a retina scan, or facial recognition followed by voice recognition, and the like), they present a technological challenge in terms of effectively utilizing such varied and source-agnostic biometric data to facilitate and optimize offensive and defensive cybersecurity operations with respect to protected computing systems.

SUMMARY OF THE DISCLOSURE

Disclosed herein are methods, systems, and processes for performing security orchestration, automation, and response (SOAR) in cybersecurity computing environments that use biometric data. One such method involves transmitting an instruction periodically to a protected computing device to perform a security scanning operation that captures biometric data generated from a biometric device associated with the protected computing device, receiving the biometric data from the protected computing device that includes a biometric identity of a trusted user or an untrusted user at a security server, accessing a security database to determine whether the biometric identity matches a stored biometric identity of the trusted user, generating a security workflow that includes orchestrated security operations configured to prevent the untrusted user from accessing the protected computing device if the biometric identity does not match the stored biometric identity, transmitting the security workflow to the protected computing device, and receiving confirmation from the protected computing device that the orchestrated security operations have been performed.

In some embodiments, prior to receiving the biometric data, the method involves receiving an indication from the protected computing device if the biometric data includes bifurcated biometric data or multiplexed biometric data. Based on receiving the indication that the biometric data comprises the bifurcated biometric data, the method involves sending a request to the protected computing device to determine whether a first part of the biometric identity included in the bifurcated biometric data is stored locally in a cache or a storage device associated with the protected computing device, requesting the protected computing device to only transmit a second part of the biometric identity included in the bifurcated biometric data if the first part of the biometric identity is stored in the cache or the local storage device, and accessing the security database to determine whether the second part of the biometric identity matches a second part of the stored biometric identity.

In other embodiments, based on receiving the indication that the biometric data comprises the multiplexed biometric data, the method involves sending a request to the protected computing device for the biometric data, and upon receiving the biometric data, demultiplexing the multiplexed biometric data into demultiplexed parts of the biometric data each generated from biometric sensors in addition to the biometric device, and configuring the security workflow to include offensive security operations and defensive security operations as part of the orchestrated security operations based on a vulnerability level attached to each biometric sensor. In this example, a first orchestrated security operation prevents file system access and a second orchestrated security operation prevents kernel access.

In certain embodiments, the method involves transmitting another instruction to the protected computing system to modify the security workflow to cause inhibition of performance of the second orchestrated security operation upon determining that the biometric identity matches the stored biometric identity of the trusted user after initiation but prior to completion of the first orchestrated security operation.

In one embodiment, the periodic instruction causes the protected computing device to perform the security scanning operation in a protected geospatial location that is proximate to the protected computing device based on a scanning range of the biometric device.

In another embodiment, one or more orchestrated security operations are performed from generated security workflows that include customized security operations to address different tactile pressure measurements (among other types of biometric readings/measurements/inputs) from a fingerprint scanner or multiple disparate facial angle measurement inputs from a facial recognition biometric device like a web camera. For example, a tactile pressure measurement that is processed by a security server that indicates at least one low tactile pressure measurement can result in an orchestrated workflow with standard security operations (e.g., locking of a protected computing device) where as a high tactile pressure measurement (or repeated tactile pressure readings) can result in a different orchestrated workflow with heightened security operations (e.g., wiping of a hard disk drive of the protected computing device).

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

Figure 1:
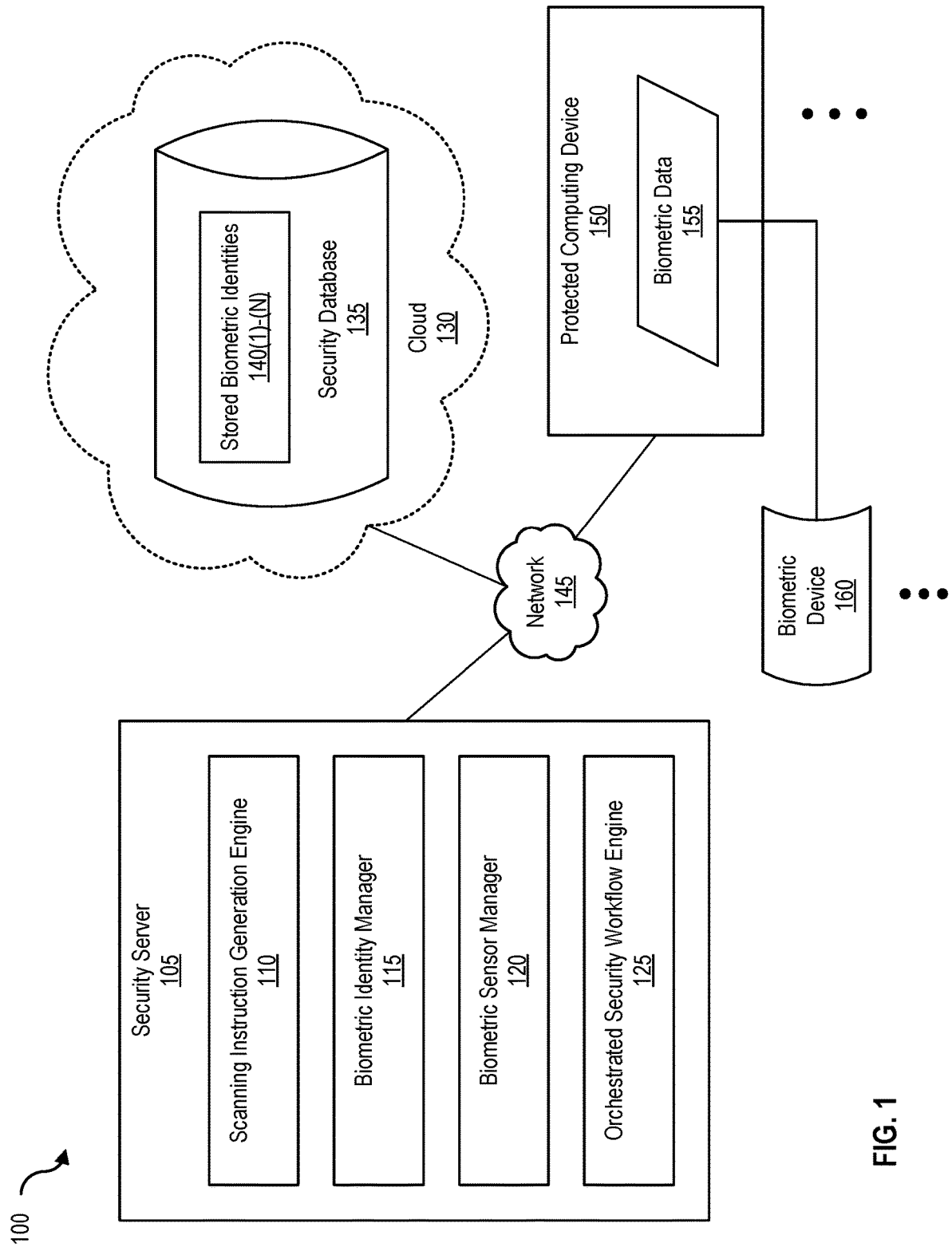
FIG. 1 is a block diagram 100 of a security orchestration, automation, and response (SOAR) system that uses biometric data, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Modern cybersecurity computing environments depend on reliable and accurate biometric data to protect computing systems, storage, and networks. Like multimode optical fibers that are designed to carry multiple light rays or modes concurrently (e.g., each at a slightly different reflection angle within the optical fiber core), multimode biometric systems facilitate the collection of biometric data from disparate biometric sensors (e.g., fingerprint scanners, retina scanners, voice recognition devices and systems, web cameras for facial recognition, and the like).

The processing of biometric identifiers is data and resource intensive. The quantitative and qualitative nature of biometric data collection and storage requires expensive storage and network resources. For example, because multimode biometric systems utilize sensor fusion to combine various forms of biometric identifiers from disparate sources, the improved reliability and usability of such biometric data comes at a cost. The storage and transmission of fingerprint data, retinal data, facial data, and the like, adds to storage and networking costs in modern cybersecurity computing environments that are already resource constrained.

Further, biometric data faces additional management-related challenges given its unique nature with respect to physiological personally identifiable information. For example, to prevent hackers from gaining access to a data repository with a full collection of biometric identities of an individual gathered from various biometric sensors, various parts of a given biometric identity can be stored in disparate locations in a bifurcated manner, significantly reducing the likelihood of the individual being identified (e.g., without having access to both constituent parts of the individual's biometric identity).

In addition, to improve computing system resource utilization by reducing storage and network bandwidth requirements, biometric data can be multiplexed. For example, multiple fingerprint images can be mixed together by using a multiplexing process (e.g., multiplexed detection of tactile pressure and finger skin temperature provided by an integrated multiplexed fingerprint sensor). Therefore, in addition to bifurcating biometric data for selective storage in disparate locations, multiplexing can be utilized to improve biometric data management.

Recent legislation like the General Data Protection Regulation (GDPR) singles out biometric data as a "sensitive" category of personal information, warranting robust protection such as requiring privacy impact assessments for processing as well as burdening organizations with expansive and onerous obligations under the framework reserved for sensitive personal data generally (e.g., obligations to effectively protect biometric data). Therefore, biometric data is a strong candidate for utilization in Security Orchestration, Automation, and Response (SOAR) computing environments.

SOAR is a technology solution stack of compatible software programs that permit modern organizations to collect data about security threats from multiple sources and respond to security events without human intervention. Capabilities provided by SOAR technologies include threat and vulnerability management (e.g., to remediate vulnerabilities by providing a formalized workflow, reporting, and collaboration), security incident response (e.g., planning, managing, tracking, and coordinating responses to security incidents), and security operations automation (e.g. automating and orchestrating workflows, processes, policy execution, and reporting).

Unfortunately, bifurcated and/or multiplexed biometric data, while advantageous in terms of minimizing resource utilization, presents a technology-related challenge in terms of facilitating offensive and defensive cybersecurity operations in SOAR computing environments. For example, in one instance, storing various parts of a biometric identity in disparate data repositories might achieve a security objective (e.g., by decreasing the likelihood that a compromise of one repository by a hacker will also compromise a given biometric identity) but can increase the time required to generate a security workflow in time-sensitive situations (e.g., given the additional time that is likely required to amalgamate parts of a biometric identity from various sources to determine whether a given user is legitimate). In another instance, a multiplexed biometric identity from multiple biometric sensors can decrease the storage and network utilization associated with data intensive biometric identifiers, but can introduce the risk of constraining a SOAR system with a "one size fits all" security policy—a policy, given its monolithic nature, may not be efficient or even particular effective (e.g., because such a one size fits all policy would require ignoring the practical security realities necessitated by the differing levels of vulnerability associated with different biometric sensors). Therefore, effectually utilizing biometric data in modern SOAR environments is a significant problem for modern organizations.

What's more, existing biometric data is typically processed locally for authentication and validation purposes. For example, biometric data-based user or owner authentication in existing computing systems often involves facial recognition or fingerprint matching based on a locally stored database of users. Because SOAR computing environments are implemented in (and from) the "cloud" (e.g., a remote datacenter), orchestrating security workflows in a timely manner is significantly hampered by the lack of cohesion between where and/or how biometric data is stored for processing and the drawbacks of not being able to intelligently extract granular biometric data for orchestrating security workflows for offensive and defensive cybersecurity operations (e.g., from bifurcated and/or multiplexed biometric datasets).

Disclosed herein are methods, systems, and processes for security orchestration using biometric data. The methods, systems, and processes disclosed herein optimize the integration and utilization of biometric data in cloud computing environments that are configured and managed for SOAR-related cybersecurity operations.

Example SOAR System for Biometric Data-Based Cybersecurity

FIG. 1 is a block diagram 100 of a security orchestration, automation, and response (SOAR) system that uses biometric data, according to one embodiment. A security server 105, which can be any type of physical or virtual computing device, includes at least a scanning instruction generation engine 110, a biometric identity manager 115, a biometric sensor manager 120, and an orchestrated security workflow engine 125. The composition of each of these foregoing components is discussed in greater detail with respect to FIG. 2, infra.

Security server 105 is communicatively coupled to a cloud 130 (e.g., a remote datacenter) as well as a protected computing device 150 via network 145, which can be any type of network or interconnection. Cloud 130 includes a security database 135 with stored biometric identities 140 (1)-(N) (e.g., of trusted users). Protected computing device 150, which can be any type of physical or virtual computing device, includes biometric data 155 received, gathered, or collected from a biometric device 160. Biometric device 160 can be any type of biometric device or biometric sensor and includes, but is not limited to, a fingerprint scanner, a retina scanner, a web camera with a facial recognition program, a voice sensor, an integrated multiplexed fingerprint sensor, and the like.

In one embodiment, the SOAR system of FIG. 1 integrates biometric sensors on protected computing device 150 (e.g., a mobile device, a desktop, a laptop, a tablet, and the like) and leverages security database 135 of users with stored biometric identities 140(1)-(N) (e.g., stored identification data) to identify current and surrounding individuals (e.g., user(s) of protected computing device 150, owner(s) of protected computing device 150, or any other person(s)). In this example, security server 105 detects when a current user of protected computing device 150 is not an owner of protected computing device 150 or a trusted user of protected computing device 150. By doing so, security server 105 enables the placement of defensive cybersecurity measures (e.g., locking the screen of protected computing device 150, alerting individuals whose computing devices are geographically proximate to protected computing device 150, and the like).

In some embodiments, biometric data 155 from protected computing device 150 is received at security server 105. Biometric data 155 is generated by protected computing device 150 by using biometric device 160 to perform a periodic scanning operation in a protected geospatial location that is proximate to protected computing device 150 and includes biometric identities that include a trusted biometric identity or an untrusted biometric identity. Security server 105 transmits a request to protected computing device 150 to determine whether a cache or a local storage device associated with protected computing device 150 includes a first part of a stored biometric identifier that matches a first part of a biometric identity (e.g., in biometric data 155). Security database 135 is accessed by security server 105 to determine whether a second part of the stored biometric identifier matches a second part of the biometric identity.

In response to the request and accessing security database 135, security server 105 makes a determination that the first part of the stored biometric identifier matches the first part of the biometric identity but the second part of the stored biometric identifier does not match the second part of the biometric identity, or that both the first part and the second part of the biometric identity do not match the first part and the second part of the stored biometric identifier, respectively. Security server 105 transmits instructions to protected computing device 150 that causes at least one defensive security action followed by at least one offensive security action to be performed on protected computing device 150 per an orchestrated security workflow and generates a notification that includes the biometric identity to be sent to other protected computing devices in the protected geospatial location proximate to protected computing device 150.

In some embodiments, security server 105 stores parts of biometric identifiers in a cache (or a local storage device) of protected computing device 150 to enable faster implementation of validation and subsequent security operations for low-level identifiers or less data intensive identifiers (e.g., fingerprints). Bifurcating a biometric identifier in this manner (e.g., storing a first part of a biometric identity in a cache of protected computing device 150 and storing a second part of the biometric identity in cloud 130) can ensure that biometric data 155 is not (and cannot be) tampered with locally on protected computing device 150.

Figure 2:
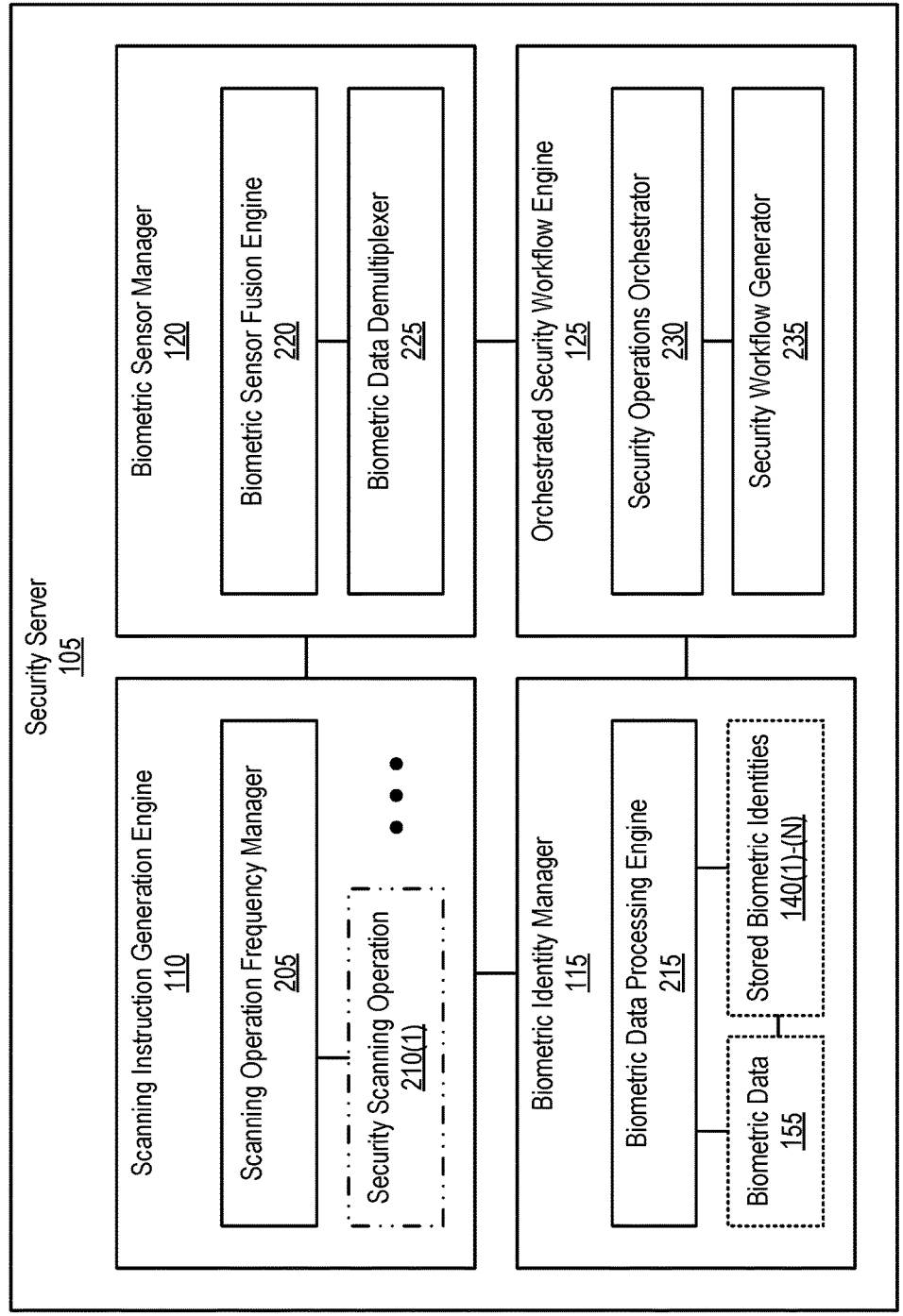
FIG. 2 is a block diagram 200 of a security server that is part of a SOAR computing environment, according to one embodiment of the present disclosure.

FIG. 2 is a block diagram 200 of a security server that is part of a SOAR computing environment, according to one embodiment. As noted, security server 105 includes scanning instruction generation engine 110, biometric identity manager 115, biometric sensor manager 120, and orchestrated security workflow engine 125. Scanning instruction generation engine 110 includes a scanning operation frequency manager 205 that transmits an instruction periodically (e.g., every minute, every 10 minutes, every hour, and the like) to protected computing device 150 to perform a security scanning operation 210(1) (e.g., activating and initializing facial recognition and image capture using a webcam based on a user and/or individual entering a sensor range (or scanning range vicinity) of the webcam, initiating a fingerprint request at a fingerprint scanner, and the like) that captures biometric data 155 generated from biometric device 160.

Biometric identity manager 115 includes a biometric data processing engine 215 that performs a comparison between biometric data 155 (received from protected computing device 150) and stored biometric identifiers 140(1)-(N) (retrieved from cloud 130). In some embodiments, biometric data processing engine 215 can also amalgamate, combine, or integrate a first part of a biometric identity received from protected computing device 150 with a second part of the (same) biometric identity retrieved by accessing security database 135 (e.g., maintained separately if no counterpart exists or as part of stored biometric identities 140(1)-(N) if a counterpart exists). Biometric data processing engine 215 can then compare the amalgamated, combined, or integrated biometric identity with a stored biometric identity to determine whether protected computing device 150 should be locked or whether access to protected computing device 150 should be disabled in some manner. It should be noted that biometric data 155 received from protected computing device 150 can include a biometric identity of a trusted user or an untrusted user based, for example, on facial recognition data within a scanning range of a web camera.

Orchestrated security workflow engine 125 includes a security operations orchestrator 230 and a security workflow generator 235. Because biometric data 155 received from protected computing device 150 can include a biometric identity of an untrusted user, security workflow generator 235 includes one or more security operations orchestrated by security operations orchestrator 230 to prevent the untrusted user from accessing protected computing device 150 if the biometric identity does not match at least one stored biometric identity. Orchestrated security workflow engine 125 then transmits the security workflow created by security workflow generator 235 to protected computing device 150 and receives confirmation from protected computing device 150 that the orchestrated security operations have been performed.

Biometric sensor manager 120 includes a biometric sensor fusion engine 220 and a biometric data demultiplexer 225. In certain embodiments, prior to receiving biometric data 155, biometric sensor manager 120 receives an indication from protected computing device 150 if biometric data 155 includes bifurcated biometric data or multiplexed biometric data. In one embodiment, based on receiving an indication that biometric data 155 is bifurcated, biometric sensor manager 120 sends a request to protected computing device 150 to determine whether a first part of a biometric identity included in the (bifurcated) biometric data is stored locally in a cache or a (local) storage device associated with protected computing device 150.

For example, if the first part of the biometric identity in the bifurcated biometric data is stored locally, only the second part of the biometric identity in the bifurcated biometric data is sent to cloud 130 by security server 105 (e.g., for comparison with a second part of a stored biometric identity). This technique can result in a faster comparison process thus facilitating a quicker security response related to orchestrating security operations and generating security workflows. Therefore, in one embodiment, based on receiving the indication that biometric data 155 includes bifurcated biometric data, biometric sensor manager 120 sends a request to protected computing device 150 to determine whether a first part of the biometric identity is stored locally and if so, requests protected computing device 150 to only transmit a second part of the biometric identity. Biometric identity manager 110 then accesses the security database 135 to determine whether the second part of the biometric identity matches a second part of one (or more) stored biometric identities (e.g., stored as stored biometric identities 140(1)-(N), and parts thereof, in cloud 130 as shown in FIG. 1).

In other embodiments, based on receiving the indication that biometric data 155 includes multiplexed biometric data (e.g., biometric data from biometric devices, joined or combined together as a dataset or a data structure), the biometric sensor manager 120 sends a request to protected computing device 150 for the (multiplexed) biometric data, and upon receiving the (multiplexed) biometric data, demultiplexes the multiplexed biometric data into demultiplexed parts of the biometric data, each demultiplexed part generated from two or more biometric sensors (including and/or in addition to biometric device 160). In this example, security workflow generator 235 generates a security workflow to include offensive and defensive security operations as part of security operations orchestrated by security operations orchestrator 230 (e.g., based on a vulnerability level attached to each biometric sensor, among other metrics).

Because security operations (e.g., operational security measures such as operational security policy, change management processes, access control, authorization, dual control, authentication and verification, and automation) can be tailored based on a pre-determined or pre-computed vulnerability level designated to each biometric sensor (e.g., a retina scan fail can be assigned a higher vulnerability rating as opposed to a fingerprint scan fail, given that retinal scans are not as likely to fail as fingerprint scans because of dirty fingerprints), such security operations can be targeted to perform orchestrated operations such a first orchestrated security operation that prevents file system access in protected computing device 150 and a second orchestrated security operation that prevents kernel access in protected computing device 150.

Similarly, because security server 105 handles biometric data in a discriminatory manner to customize security workflows, in some embodiments, security server 105 transmits an instruction to protected computing system 150 to modify an (existing) security workflow to cause inhibition of (the) performance of a second orchestrated security operation upon determining that the biometric identity (or a part thereof), matches a stored biometric identity (or a part thereof), of a trusted user after initiation but prior to completion of the first orchestrated security operation. As noted, because the aforementioned periodic instruction causes protected computing device 150 to perform the security scanning operation in a protected geospatial location that is proximate to protected computing device 150 based on a scanning range of biometric device 160, security workflows can be interrupted to cause inhibition of performance of orchestrated security operations in the security workflow retroactively in the protected geospatial location.

Example Multimodal Biometric System to Orchestrate Security Workflows

Figure 3:
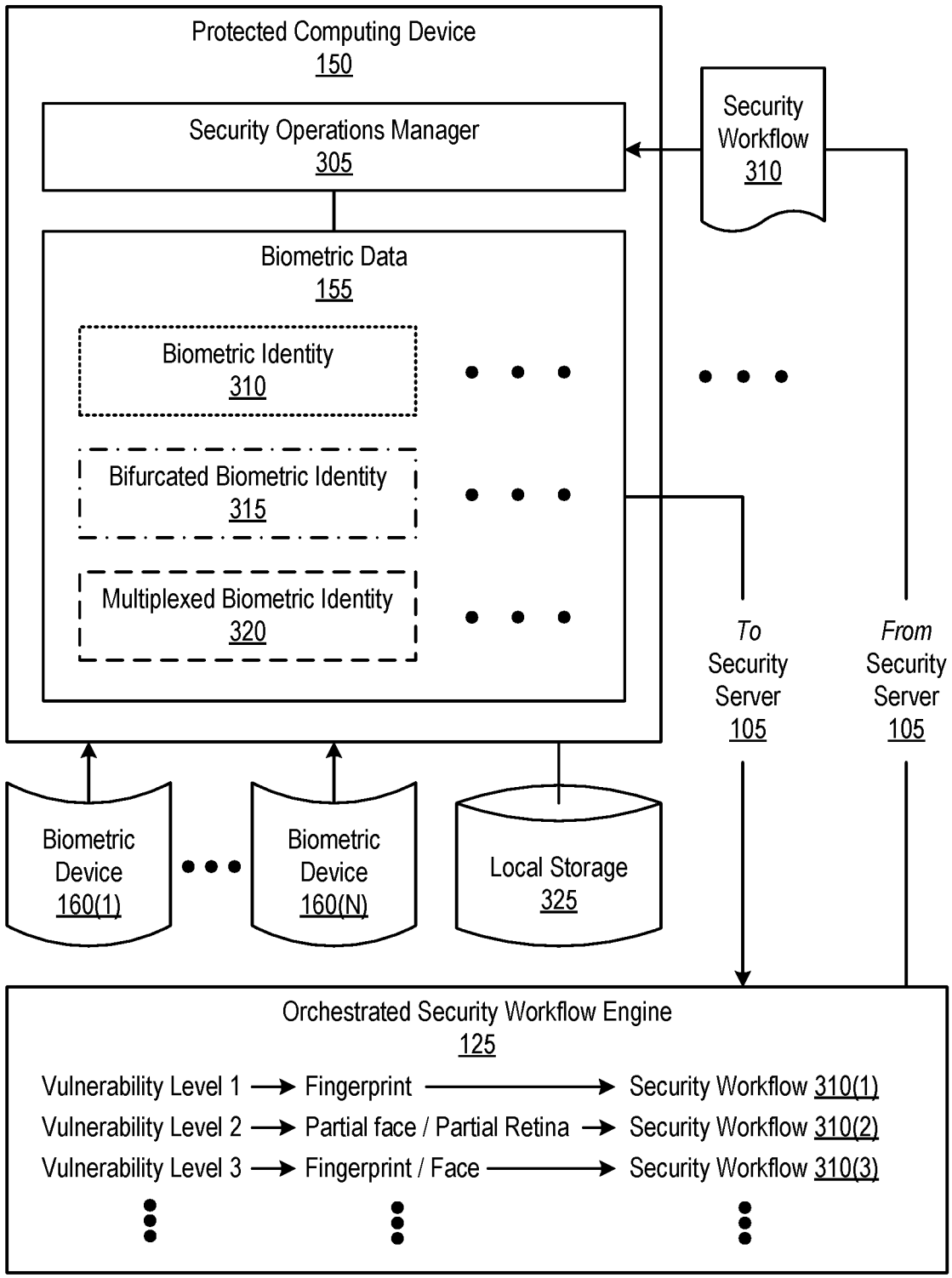
FIG. 3 is a block diagram 300 of a multimodal biometric system that generates security workflows, according to one embodiment of the present disclosure.

FIG. 3 is a block diagram 300 of a multimodal biometric system that generates security workflows, according to one embodiment. Protected computing device 150 includes a security operations manager 305 and biometric data 155 (or a part thereof) that is retrieved or generated from one or more biometric devices communicatively coupled to and/or associated with protected computing device 150 (e.g., a web camera with facial recognition) and is communicatively coupled to biometric devices 160(1)-(N) and local storage 325. In one embodiment, protected computing device 150 sends one or more different types of biometric data 155 (e.g., biometric identity 310, bifurcated biometric identity 315, and/or multiplexed biometric identity 320) to orchestrated security workflow engine 125.

Biometric identity 310 is biometric data that is generated by (or retrieved from) a biometric device and includes a full biometric identity (e.g., an entire fingerprint, a complete retina scan, and the like). Bifurcated (e.g., split or divided) biometric identity is biometric data that contains a partial biometric identity (e.g., half a fingerprint) and can be stored in local storage 325 by protected computing device 150. The counterpart to the partial biometric identity (e.g., to formulate or generate a full biometric identity) can be sent to security server 105 to be stored remotely (e.g., in cloud 130). Bifurcated biometric identity 315 permits partial biometric data comparison locally or a full biometric data comparison remotely (e.g., by security server 105 upon combining the various constituent parts of the biometric identity).

Multiplexed biometric identity 320 is a biometric data dataset (or data structure) that contains multiple biometric data inputs of (or from) the same user or individual from the same biometric device or multiple biometric devices (e.g., multiplexed simultaneous detection of tactile pressure and finger skin temperature in a transparent and flexible fingerprint sensor array). These various (and disparate) biometric inputs can be multiplexed prior to transmission to orchestrated security workflow engine 125 and then demultiplexed based on a security vulnerability level assigned to the type of biometric identity to generate a security workflow 310. For example, orchestrated security workflow engine 125 can retrieve facial image information from a multiplexed image using a single demultiplexing process. Orchestrated security workflow engine 125 then generates and sends security workflow 310 to protected computing device 150.

Security workflow 310 includes two or more security operations that are customized (e.g., to follow each other or to be performed in a given order) based on one or more forms of biometric data received from protected computing device 150 at orchestrated security workflow engine 125. As noted, orchestrated security workflow engine 125 can generate different (types of) security workflows based on a vulnerability level assigned to a given type of biometric identity or to a given combination of biometric identities. For example, orchestrated security workflow engine 125 can generate a security workflow 310(1) based on a vulnerability level of 1 assigned to a fingerprint, a security workflow 310(2) based on a vulnerability level of 2 assigned to a combination of a partial face and a partial retina, a security workflow 310(3) based on a vulnerability level of 3 assigned to a combination of a fingerprint and a face (e.g., tactile pressure+facial angle), and the like. In one embodiment, a given vulnerability level (or severity level) assigned or designated to a given biometric identity or a combination of biometric identities and/or types of biometric identities thereof, can be based on (or can be modified based on) a Certified Vulnerability Scoring System (CVSS) score or other comparable vulnerability metrics.

Example of Orchestrating Security Workflows Using Biometric Data

Figure 4:
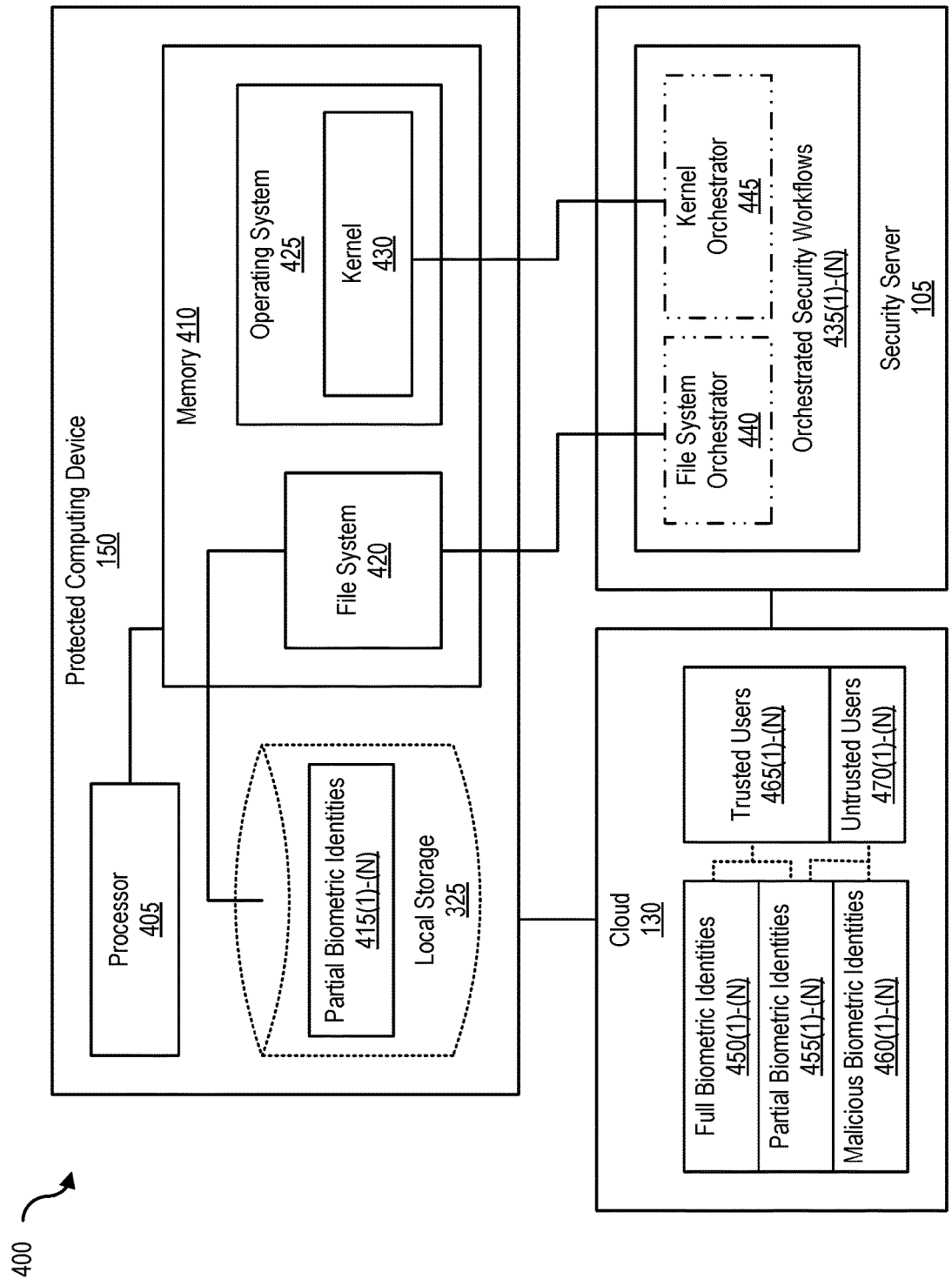
FIG. 4 is a block diagram 400 of a multimodal biometric system in a SOAR computing environment, according to one embodiment of the present disclosure.

FIG. 4 is a block diagram 400 of a multimodal biometric system in a SOAR computing environment, according to one embodiment. As shown in FIG. 4, protected computing device 150 includes a processor 405 and a memory 410 that implements a file system 420, and an operating system 425 with a kernel 430. Protected computing device 150 includes local storage 325 (e.g., a dedicated cache, a virtual disk, or a Hard Disk Drive (HDD)) that maintains and stores partial biometric identities 415(1)-(N). Protected computing device 150 is communicatively coupled to cloud 130 and security server 105 (e.g., via network 145).

Cloud 130 includes full biometric identities 450(1)-(N), partial biometric identities 455(1)-(N), and malicious biometric identities 460(1)-(N). Full biometric identities 450(1)-(N) and a part of partial biometric identities 455(1)-(N) (e.g., 455(1)-(10)) are associated with trusted users 465(1)-(N), and another part of partial biometric identities 455(1)-(N) (e.g., 455(10)-(20)) and malicious biometric identities 460(1)-(N) are associated with untrusted users 470(1)-(N). Security server 105 generates orchestrated security workflows 435(1)-(N) (e.g., using a file system orchestrator 440 and a kernel orchestrator 445).

In some embodiments, file system orchestrator 440 and kernel orchestrator 445 each generate a security workflow with two or more security operations to protect file system 420 and kernel 430, respectively (e.g., if a biometric identity, a part of a bifurcated biometric identity, or a portion of a multiplexed biometric identity does not match a stored biometric identity or a part or portion thereof). For example, a first orchestrated security operation prevents access of file system 420 and a second orchestrated security operation prevents access of kernel 430 (e.g., by users of malicious biometric identities 460(1)-(N)).

In one embodiment, security server 105 transmits an instruction periodically to protected computing device 150 to perform a security scanning operation that captures biometric data generated from a biometric device associated with protected computing device 150. Security server receives biometric data from protected computing device 150 that includes a biometric identity or part (e.g., bifurcated) or portion (e.g., multiplexed) thereof, of a trusted user (e.g., trusted users 465(1)-(N)) or untrusted users (e.g., untrusted users 470(1)-(N)). Security server 105 then determines whether the biometric identity matches a stored biometric identity of the trusted user and generates an orchestrated security workflow that includes orchestrated security operations configured to prevent the untrusted user from accessing protected computing device 150 if the biometric identity does not match the stored biometric identity. In this example, security server 105 then transmits the security workflow to protected computing device 150 and receives confirmation from protected computing device 150 that the orchestrated security operations (that are part of orchestrated security workflows 435(1)-(N)) have been performed.

In one embodiment, an orchestrated security workflow 435(1) can include a security operation orchestrated by file system orchestrator 440 (to be performed) followed by another security operation orchestrated by kernel orchestrator 445 (e.g., because of a malicious biometric identity 460(1) of an untrusted user 470(1)). However, if a trusted user 465(1) authenticates with protected computing device 150 using a valid biometric identity, or a part or portion thereof, security server 105 can inhibit the performance of the another security operation orchestrated by kernel orchestrator 445 if the authentication or validation by trusted user 465(1) is performed while the security operation orchestrated by file system orchestrator 440 is ongoing (and has not yet completed). In this manner, security server 105 can orchestrate security workflows to perform customized and targeted security operations based on disparate biometric data.

Example Processes for Security Orchestration Using Biometric Data

Figure 5:
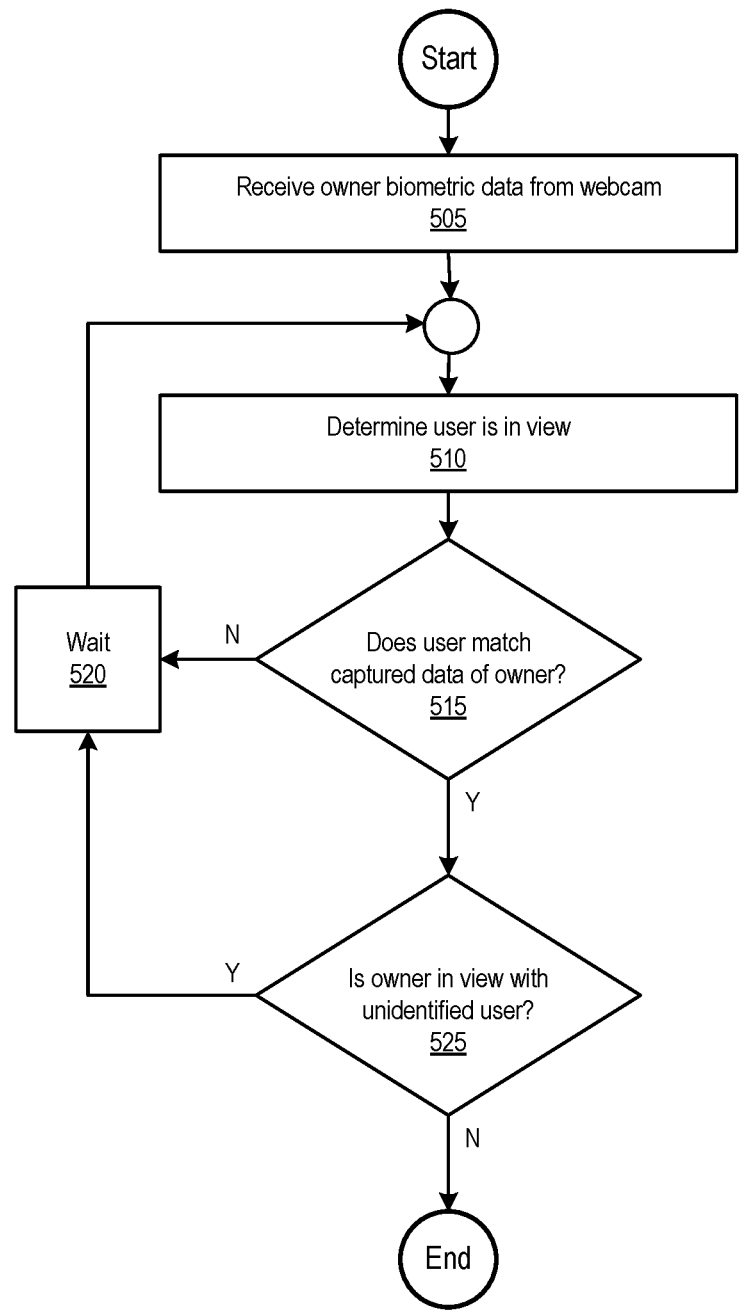
FIG. 5 is a flowchart 500 of a process to prevent access to a computing device using biometric data, according to one embodiment of the present disclosure.

FIG. 5 is a flowchart 500 of a process to prevent access to a computing device using biometric data, according to one embodiment. The process begins at 505 by receiving owner biometric data from a web camera. For example, users are identified and sorted into categories using a web camera of a protected computing device and facial recognition software (e.g., a trusted list with the owner and users of the protected computing device and an untrusted list of users not on the trusted list and users who are unidentified).

At 510, the process determines whether a user is in view (e.g., security server 105 causes protected computing device 150 to periodically check for new faces coming into view of the web camera), and at 515, determines whether the user matches captured data of the owner (e.g., using stored biometric data (locally or in the cloud) to identify the categories of people or individuals in view of the web camera). If the user does not match captured data of the owner, the process loops to 520 and waits, and then loops to 510. However, if the user matches captured data of the owner (e.g., in whole or in part), the process, at 525, determines whether the owner is in view with an unidentified user (e.g., a determination is made whether there are trusted users together with untrusted users in the view of the web camera).

For example, if the owner is in view with an unidentified user, the process loops to 520 and waits, and then loops to 510. On the other hand, if the owner is not in view with an unidentified user, the process ends. In this example, security server 105 can execute security measures if there are no trusted users in view of the web camera and the protected computing device is used (e.g., a keyboard or mouse event is triggered). However, if there are trusted users in view of the web camera, no security action is caused to be taken by protected computing device 150 by security server 105 (e.g., so that security measures cannot be inadvertently set off by a new person coming in view of the web camera of the protected computing device).

As noted, security server 105 can execute security measures (e.g., on protected computing device 150) if there are no trusted users in view of the web camera and protected computing device 150 is used (in some manner). For example, a security workflow can be configured to electronically mail a photograph of an untrusted user in view of the web camera (e.g., to the owner or a trusted user) after protected computing device 150 is locked.

Figure 6:
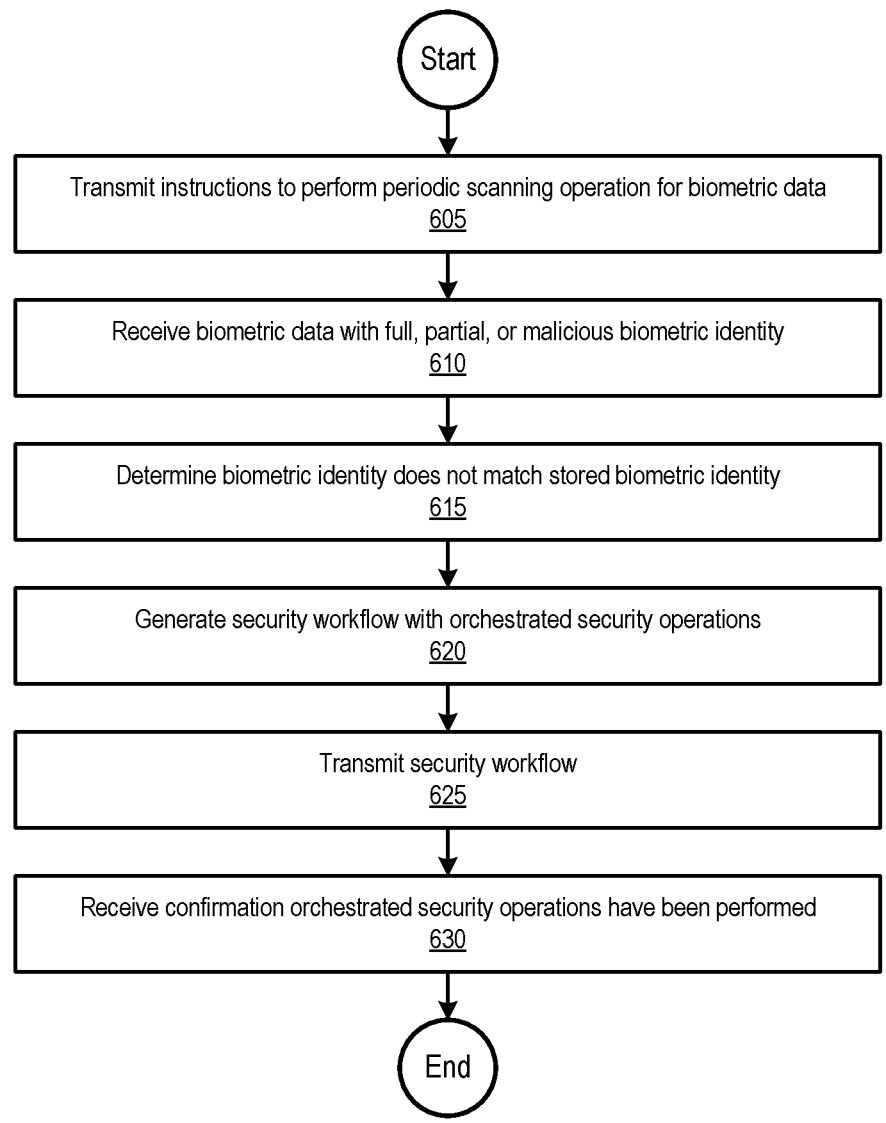
FIG. 6 is a flowchart 600 of a process to orchestrate cybersecurity computing operations, according to one embodiment of the present disclosure.

FIG. 6 is a flowchart 600 of a process to orchestrate cybersecurity computing operations, according to one embodiment. The process begins at 605 by transmitting instructions (e.g., to protected computing device 150) to perform periodic scanning operations for biometric data (e.g., from biometric sensors, biometric devices, and the like). A 610, the process receives biometric data with full, partial, or malicious biometric identity (e.g., as shown in FIG. 4).

At 615, the process determines that a biometric identity (in the received biometric data) does not match a stored biometric identity (e.g., in part or in full). At 620, the process generates a security workflow with orchestrated security operations (e.g., orchestrated security workflows 435(1)-(N) as shown in FIG. 4), and at 625, transmits the security workflow (e.g., to a protected computing device). The process ends at 630 by receiving a confirmation that the orchestrated security operations have been performed.

Figure 7:
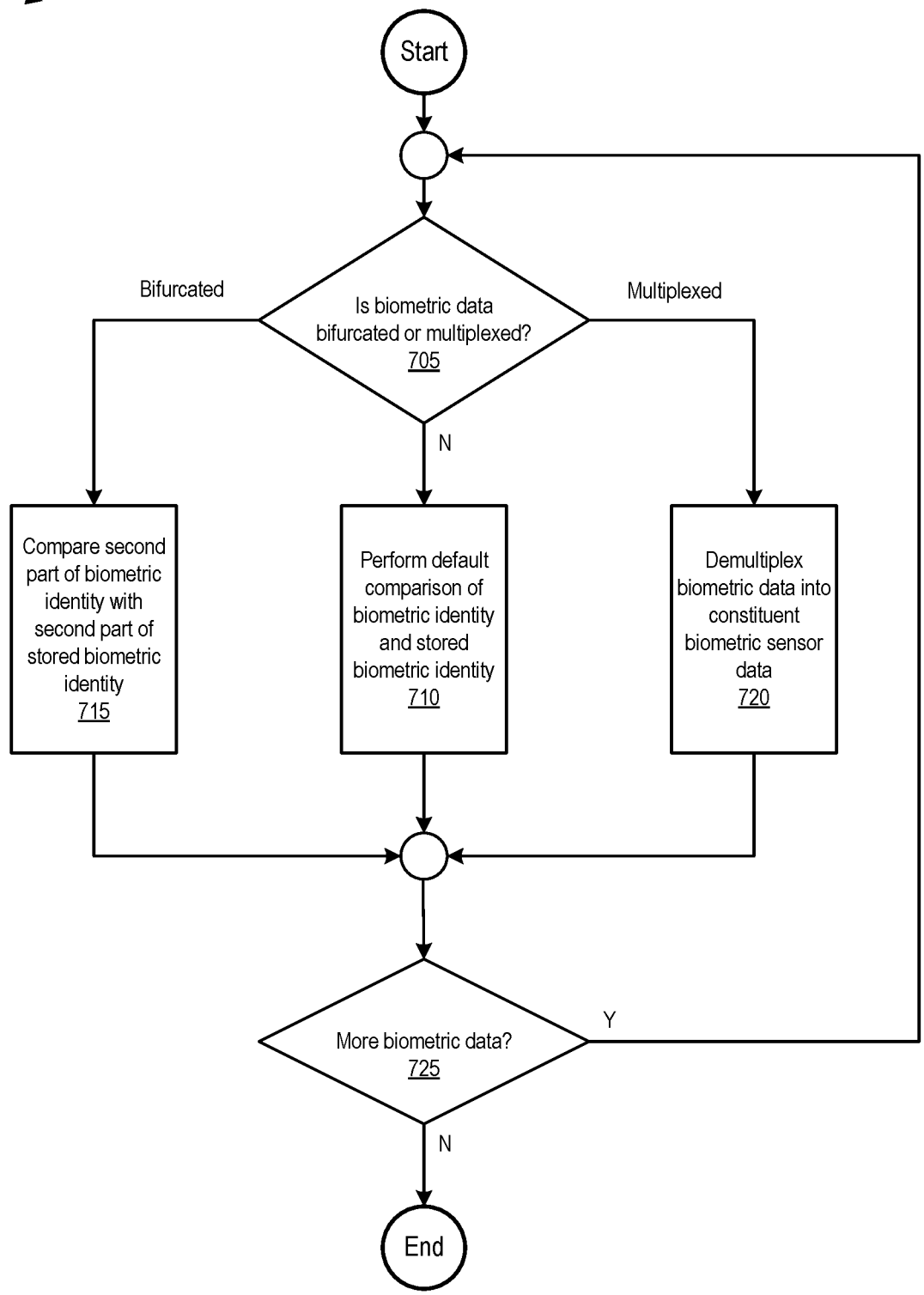
FIG. 7 is a flowchart 700 of a process to compare bifurcated or multiplexed biometric data, according to one embodiment of the present disclosure.

FIG. 7 is a flowchart 700 of a process to compare bifurcated or multiplexed biometric data, according to one embodiment. The process begins at 705 by determining whether biometric data is bifurcated or multiplexed. If the biometric data is neither bifurcated or multiplexed, the process, at 710, performs a default comparison of a biometric identity that is part of the biometric data and a stored biometric identity (e.g., locally or remotely).

If the biometric data is bifurcated, the process, at 715, compares a second part of a biometric identity (e.g., requested from the protected computing device) with a second part of the (corresponding) stored biometric identity (e.g., after storing a first part of the biometric identity in a cache of the protected computing device for later comparison with a first part of the (corresponding) stored biometric identity).

However, if the biometric data is multiplexed (e.g., from a multiplexed facial recognition system embedded in a web camera where various facial angles are captured and multiplexed into a single multiplexed biometric identity for transmittal), the process, at 720, demultiplexes the biometric data into constituent biometric sensor data (e.g., multiple inputs from different biometric sensors) or into constituent portions (e.g., multiple inputs from the same biometric device). At 725, the process determines if there is more biometric data. If there is more biometric data, the process loops to 705. Otherwise, the process ends.

Example Computing Environment

Figure 8:
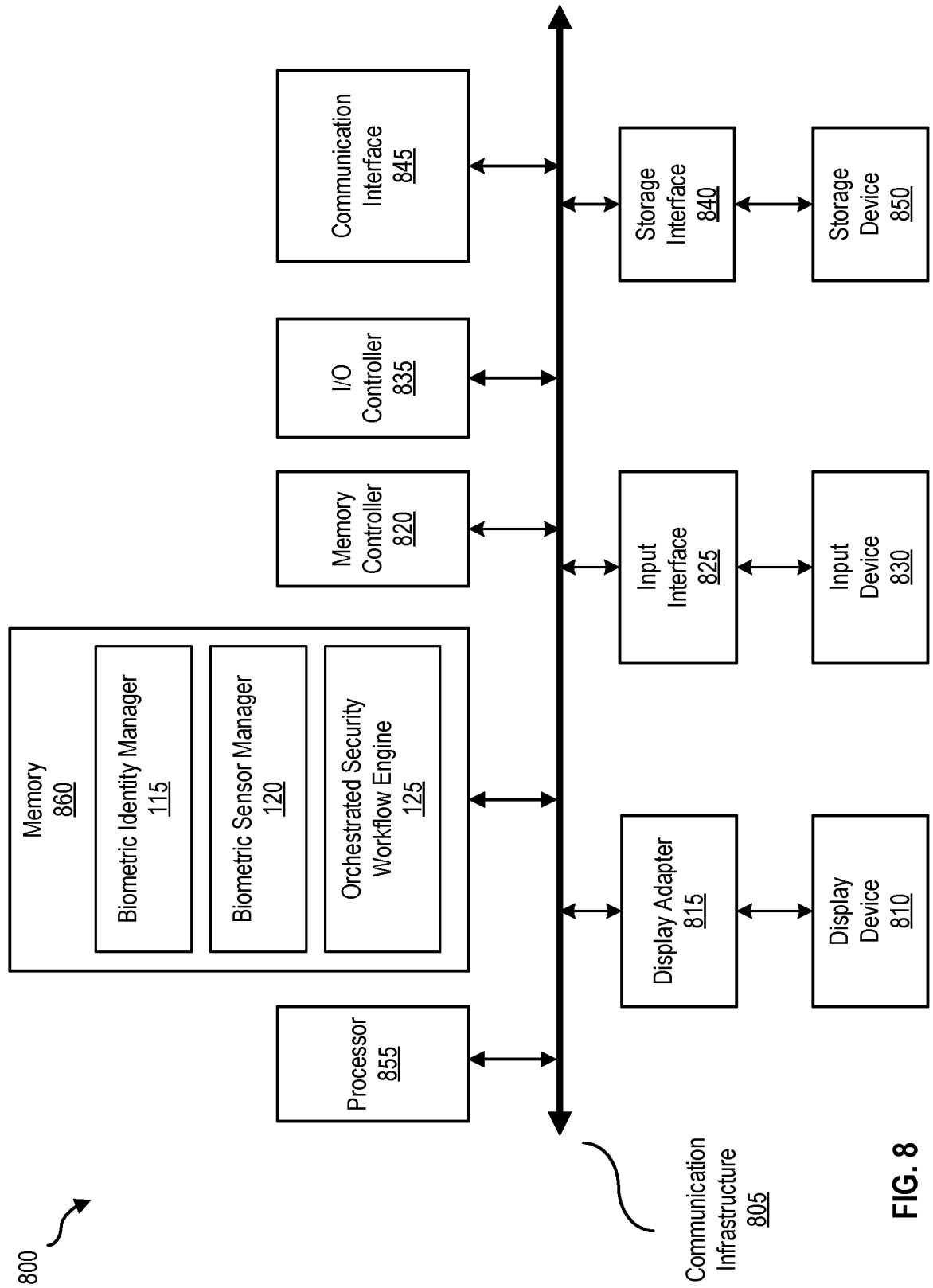
FIG. 8 is a block diagram 800 of a computing system, illustrating a biometric identity manager, a biometric sensor manager, and an orchestrated security workflow engine implemented in software, according to one embodiment of the present disclosure.

FIG. 8 is a block diagram 800 of a computing system, illustrating how biometric identity manager 115, biometric sensor manager 120, and/or orchestrated security workflow engine 125 can be implemented in software, according to one embodiment. Computing system 800 can include security server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes biometric identity manager 115, biometric sensor manager 120, and/or orchestrated security workflow engine 125, computing system 800 becomes a special purpose computing device that is configured to orchestrate security operations and workflows using biometric data.

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, random access memory (RAM), read only memory (ROM), flash memory, or any other suitable memory device. In certain embodiments computing system 800 may include both a volatile memory unit and a non-volatile storage device. In one example, program instructions implementing biometric identity manager 115, biometric sensor manager 120, and/or orchestrated security workflow engine 125 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805, and may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
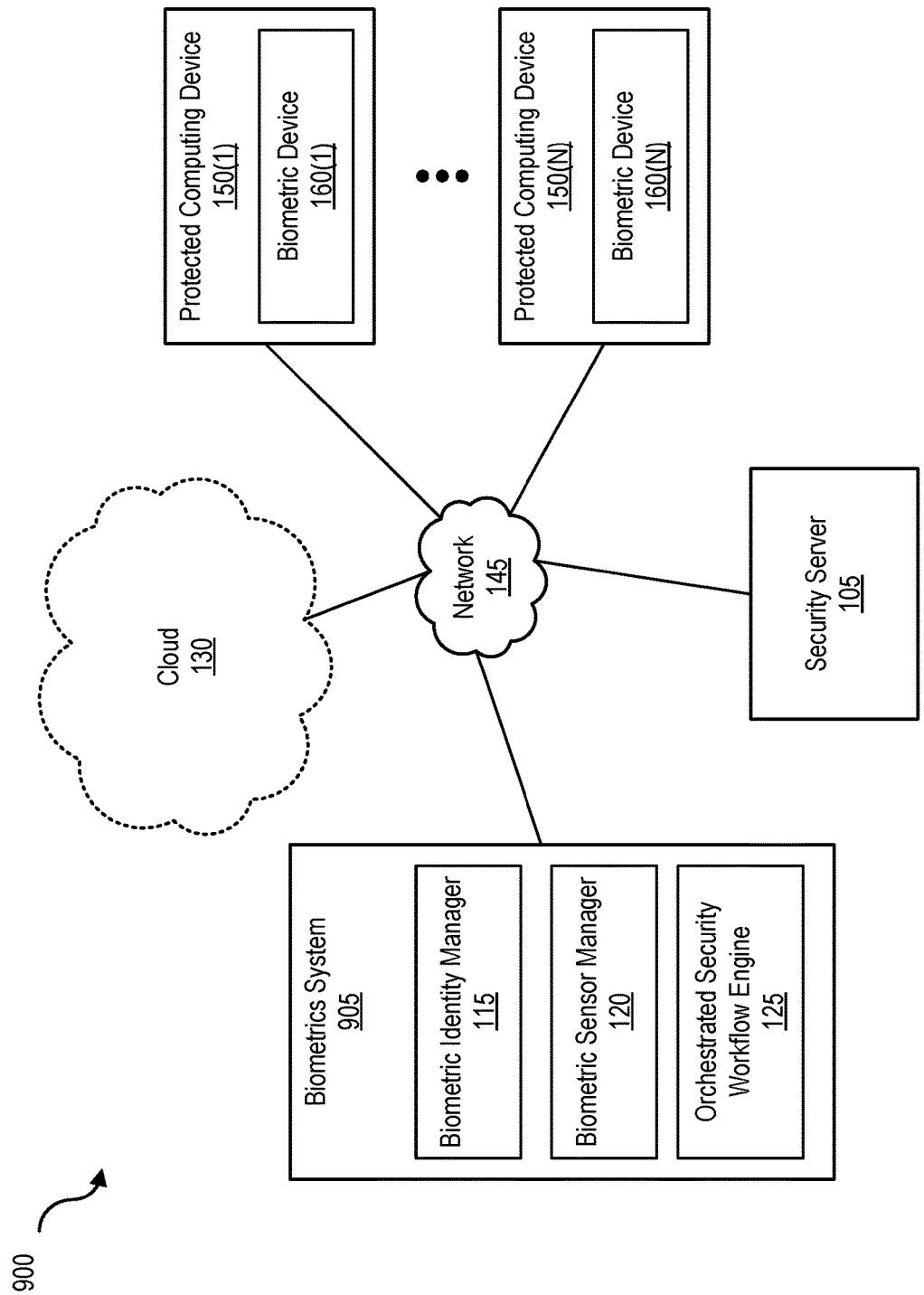
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 145 generally represents any type or form of computer network or architecture capable of facilitating communication between biometrics system 905, security server 105, cloud 130, and/or protected computing devices 160(1)-(N). For example, network 145 can be a Wide Area Network (WAN) (e.g., the Internet) or a Local Area Network (LAN). In certain embodiments, a communication interface, such as communication interface 845 in FIG. 8, may be used to provide connectivity between biometrics system 905, security server 105, cloud 130, and/or protected computing devices 160(1)-(N), and network 145.

Biometric identity manager 115, biometric sensor manager 120, and/or orchestrated security workflow engine 125 may be part of security server 105, or may be separate. If separate, biometrics system 905 and security server 105 may be communicatively coupled via network 145. All or a portion of embodiments may be encoded as a computer program and loaded onto and executed by security server 105 and/or biometrics system 905, and may be stored on security server 105 and/or biometrics system 905, and distributed over network 145.

In some examples, all or a portion of security server 105 and/or biometrics system 905 may represent portions of a cloud-computing (e.g., cloud 130) or network-based environment. Cloud-computing environments may provide various services and applications via the Internet. These cloud-based services (e.g., software as a service, platform as a service, infrastructure as a service, (cyber)-security as a service etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, biometric identity manager 115, biometric sensor manager 120, and/or orchestrated security workflow engine 125 may transform the behavior of security server 105 and/or biometrics system 905 to perform customized security orchestration and automation using biometric data (e.g., based on the type of biometric data).

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    transmitting, from a security server, an instruction periodically to a protected computing device to perform a security scanning operation that captures biometric data generated, at least in part, from a biometric device associated with the protected computing device;
    receiving an indication from the protected computing device if the biometric data comprises bifurcated biometric data or multiplexed biometric data;
    sending a request to the protected computing device to determine whether a first part of a biometric identity comprised in the bifurcated biometric data is stored locally in a cache or a storage device associated with the protected computing device;
    requesting the protected computing device to only transmit a second part of the biometric identity comprised in the bifurcated biometric data if the first part of the biometric identity is stored in the cache or the local storage device;
    accessing a security database to determine whether the second part of the biometric identity matches a second part of the stored biometric identity;
    receiving, at the security server, the bifurcated biometric data from the protected computing device that comprises the second part of the biometric identity of a trusted user or an untrusted user;
    accessing the security database to determine whether the second part of the biometric identity matches a stored biometric identity of the trusted user;
    generating a security workflow comprising a plurality of orchestrated security operations configured to prevent the untrusted user from accessing the protected computing device if the second part of the biometric identity does not match the stored biometric identity;
    transmitting the security workflow to the protected computing device; and
    receiving confirmation from the protected computing device that the plurality of orchestrated security operations have been performed.

2. The computer-implemented method of claim 1, wherein
    the periodic instruction causes the protected computing device to perform the security scanning operation in a protected geospatial location that is proximate to the protected computing device based on a scanning range of the biometric device.

3. The computer-implemented method of claim 1, further comprising:
    based on receiving the indication that the biometric data comprises the multiplexed biometric data, sending a request to the protected computing device for the biometric data;
    upon receiving the biometric data, demultiplexing the multiplexed biometric data into a plurality of demultiplexed parts of the biometric data, each generated from one or more biometric sensors in addition to the biometric device; and
    configuring the security workflow to comprise one or more offensive security operations and one or more defensive security operations as part of the plurality of orchestrated security operations based on a vulnerability level attached to each biometric sensor of the one or more biometric sensors.

4. The computer-implemented method of claim 1, wherein:
    a first orchestrated security operation of the plurality of orchestrated security operations prevents file system access, and
    a second orchestrated security operation of the plurality of orchestrated security operations prevents kernel access.

5. The computer-implemented method of claim 4, further comprising:
    transmitting another instruction to the protected computing system to modify the security workflow to cause inhibition of performance of the second orchestrated security operation upon determining that the biometric identity matches the stored biometric identity of the trusted user after initiation but prior to completion of the first orchestrated security operation.

6. A non-transitory computer readable storage medium comprising program instructions executable to:
    transmit, from a security server, an instruction periodically to a protected computing device to perform a security scanning operation that captures biometric data generated, at least in part, from a biometric device associated with the protected computing device;
    receive an indication from the protected computing device if the biometric data comprises bifurcated biometric data or multiplexed biometric data;
    send a request to the protected computing device to determine whether a first part of a biometric identity comprised in the bifurcated biometric data is stored locally in a cache or a storage device associated with the protected computing device;
request the protected computing device to only transmit a second part of the biometric identity comprised in the bifurcated biometric data if the first part of the biometric identity is stored in the cache or the local storage device;
access a security database to determine whether the second part of the biometric identity matches a second part of the stored biometric identity;
receive, at the security server, the bifurcated biometric data from the protected computing device that comprises the second part of the biometric identity of a trusted user or an untrusted user;
access the security database to determine whether the second part of the biometric identity matches a stored biometric identity of the trusted user;
generate a security workflow comprising a plurality of orchestrated security operations configured to prevent the untrusted user from accessing the protected computing device if the second part of the biometric identity does not match the stored biometric identity;
transmit the security workflow to the protected computing device; and
receive confirmation from the protected computing device that the plurality of orchestrated security operations have been performed.

7. The non-transitory computer readable medium of claim 6, wherein
the periodic instruction causes the protected computing device to perform the security scanning operation in a protected geospatial location that is proximate to the protected computing device based on a scanning range of the biometric device.

8. The non-transitory computer readable medium of claim 6, further comprising:
based on receiving the indication that the biometric data comprises the multiplexed biometric data, sending a request to the protected computing device for the biometric data;
upon receiving the biometric data, demultiplexing the multiplexed biometric data into a plurality of demultiplexed parts of the biometric data, each generated from one or more biometric sensors in addition to the biometric device; and
configuring the security workflow to comprise one or more offensive security operations and one or more defensive security operations as part of the plurality of orchestrated security operations based on a vulnerability level attached to each biometric sensor of the one or more biometric sensors.

9. The non-transitory computer readable medium of claim 6, wherein:
a first orchestrated security operation of the plurality of orchestrated security operations prevents file system access, and
a second orchestrated security operation of the plurality of orchestrated security operations prevents kernel access.

10. The non-transitory computer readable medium of claim 9, further comprising:
transmitting another instruction to the protected computing system to modify the security workflow to cause inhibition of performance of the second orchestrated security operation upon determining that the biometric identity matches the stored biometric identity of the trusted user after initiation but prior to completion of the first orchestrated security operation.

11. A system comprising:
one or more processors; and
a memory coupled to the one or more processors, wherein the memory stores program instructions executable by the one or more processors to:
transmit, from a security server, an instruction periodically to a protected computing device to perform a security scanning operation that captures biometric data generated, at least in part, from a biometric device associated with the protected computing device;
receive an indication from the protected computing device if the biometric data comprises bifurcated biometric data or multiplexed biometric data;
send a request to the protected computing device to determine whether a first part of a biometric identity comprised in the bifurcated biometric data is stored locally in a cache or a storage device associated with the protected computing device;
request the protected computing device to only transmit a second part of the biometric identity comprised in the bifurcated biometric data if the first part of the biometric identity is stored in the cache or the local storage device;
access a security database to determine whether the second part of the biometric identity matches a second part of the stored biometric identity;
receive, at the security server, the bifurcated biometric data from the protected computing device that comprises the second part of the biometric identity of a trusted user or an untrusted user;
access the security database to determine whether the second part of the biometric identity matches a stored biometric identity of the trusted user;
generate a security workflow comprising a plurality of orchestrated security operations configured to prevent the untrusted user from accessing the protected computing device if the second part of the biometric identity does not match the stored biometric identity;
transmit the security workflow to the protected computing device; and
receive confirmation from the protected computing device that the plurality of orchestrated security operations have been performed.

12. The system of claim 11, wherein
the periodic instruction causes the protected computing device to perform the security scanning operation in a protected geospatial location that is proximate to the protected computing device based on a scanning range of the biometric device.

13. The system of claim 11, further comprising:
based on receiving the indication that the biometric data comprises the multiplexed biometric data, sending a request to the protected computing device for the biometric data;
upon receiving the biometric data, demultiplexing the multiplexed biometric data into a plurality of demultiplexed parts of the biometric data, each generated from one or more biometric sensors in addition to the biometric device; and
configuring the security workflow to comprise one or more offensive security operations and one or more defensive security operations as part of the plurality of orchestrated security operations based on a vulnerability level attached to each biometric sensor of the one or more biometric sensors.

14. The system of claim 11, wherein:
a first orchestrated security operation of the plurality of orchestrated security operations prevents file system access,
a second orchestrated security operation of the plurality of orchestrated security operations prevents kernel access, and
another instruction transmitted to the protected computing system to modify the security workflow causes inhibition of performance of the second orchestrated security operation if the biometric identity matches the stored biometric identity of the trusted user after initiation but prior to completion of the first orchestrated security operation.

* * * * *